Dec. 26, 1939. F. J. C. SMITH 2,184,980
FUME EXHAUSTING SOLDERING IRON
Filed Feb. 16, 1939 2 Sheets-Sheet 2
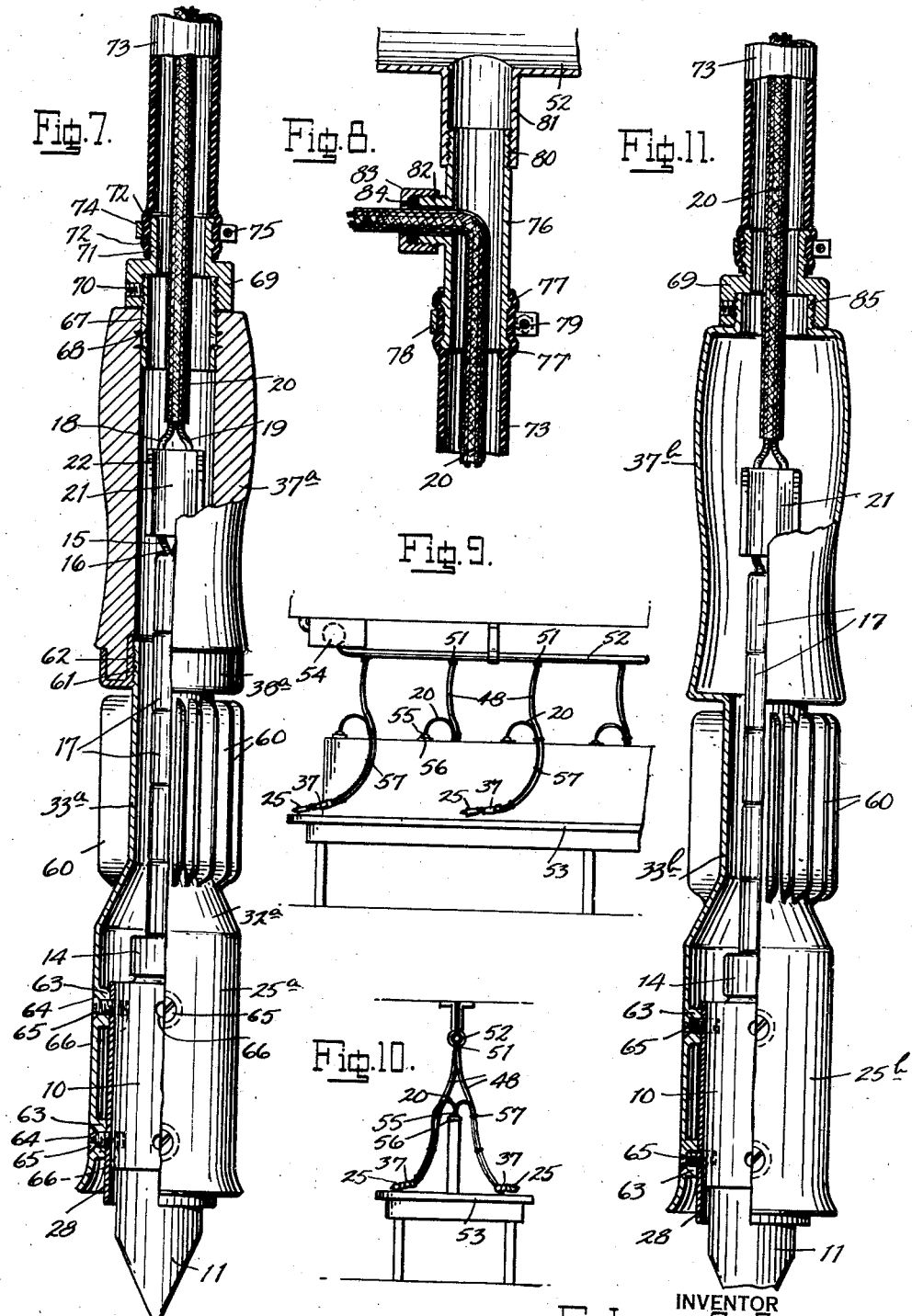
INVENTOR
F. JAMES C. SMITH.
BY
ATTORNEY Patented Dec. 26, 1939

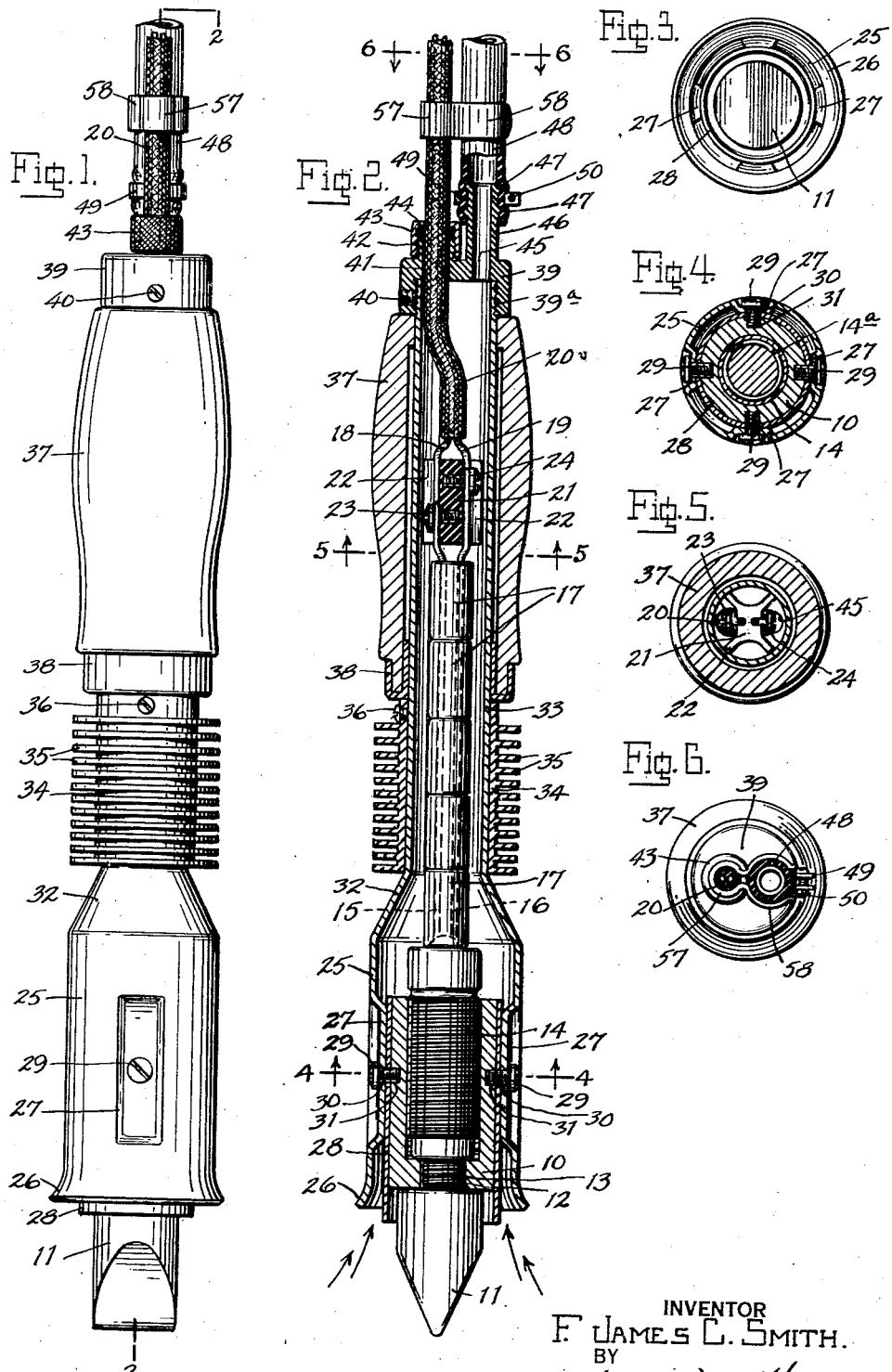

2,184,980

UNITED STATES PATENT OFFICE 2,184,980

FUME EXHAUSTING SOLDERING IRON

Frederick James C. Smith, Milford, Conn., assignor to Dorothy McCracken Smith, Okeene, Okla.

Application February 16, 1939, Serial No. 256,636

10 Claims. (Cl. 219—26)

The present invention relates to an improved fume exhausting soldering iron, particularly of the self-heating electric type. In certain types of soldering work, particularly in factories where the workers operate soldering irons for long periods, the fumes produced from the flux employed in connection with the soldering operation are annoying, hamper the work, and when the operator is subjected to them for a considerable period are apt to be injurious. Attempts have been made heretofore to provide means for conducting fumes away from the soldering iron, but these have been such that they interfered with the operation of the iron, did not permit of free manipulation of the iron, and were so related to the tip of the iron that they tended to cool it to such an extent that it interfered with the normal soldering operation of the iron.

It is an object of the present invention to provide fume exhausting means which may be incorporated in an electric soldering iron without materially changing the structure or design of the iron, which will not interfere with the operation of the iron, will enable it to be turned and operated in any position, and will exhaust the fumes resulting from the soldering operation without cooling the soldering iron. A further object is to provide fume exhausting means which will form a support and housing for the head and tip of the soldering iron, and which will further provide a support for the handle. It is further proposed to provide cooling means carried by the fume exhausting means between the soldering iron head and the handle, so that any heat that may be transmitted to the fume exhausting means will be prevented from reaching the handle.

It is further proposed to support the soldering head and tip in such relation to the cooling means that there will be no appreciable loss of heat to the fume exhausting means, the arrangement being such that the heat will be effectually confined to the head and tip.

Another object is to provide fume exhausting means which may be economically and conveniently incorporated in the original soldering iron assembly, or may be furnished as an accessory for attachment to existing types of soldering irons.

With the above and other objects in view, embodiments of the invention are shown in the accompanying drawings, and these embodiments will be hereinafter more fully described with reference thereto, and the invention will be finally pointed out in the claims.

In the drawings:

Fig. 1 is a top plan view of a fume exhausting soldering iron, according to an exemplary illustrated embodiment of the invention.

Fig. 2 is a longitudinal sectional view taken along the line 2—2 of Fig. 1.

Fig. 3 is a front end elevation.

Fig. 4 is a transverse sectional view taken along the line 4—4 of Fig. 2.

Fig. 5 is a transverse sectional view taken along the line 5—5 of Fig. 2.

Fig. 6 is a transverse sectional view taken along the line 6—6 of Fig. 2.

Fig. 7 is a view partially in longitudinal section and partially in side elevation, showing a fume exhausting soldering iron, according to a modified form of the invention.

Fig. 8 is a longitudinal sectional view of connection means and adjacent parts, for use in connection with the iron as illustrated in Fig. 7.

Fig. 9 is a diagrammatic side elevation of one end of a work table with a series of fume exhausting soldering irons provided according to the invention, one iron being provided at each work place.

Fig. 10 is an end view of the work table.

Fig. 11 is a view, partially in longitudinal section and partially in side elevation, of a further modification of the invention.

Similar reference characters indicate corresponding parts throughout the several figures of the drawings.

Referring to the drawings, and more particularly to Figs. 1 to 6 thereof, the electric soldering iron, which may be of any standard type, is shown as comprising a tip preferably of copper, consisting of a hollow interiorly threaded head member 10, and a removable tip member 11, having its threaded shank 12 screwed into a threaded socket 13 in the forward end of the member 10. Within the threaded hollow passage of the head member 10 there is screwed a heating unit 14 having an exteriorly threaded case within which there is provided the usual coil of resistance wire 14a, the conductors 15 and 16 of which extend rearwardly from the unit through a series of insulating beads 17, these being preferably of the well-known porcelain interlocking type.

The conductors 15 and 16 are connected to the energizing conductors 18 and 19 of the cable 20 by means of an insulated connection block 21, this block having radially extending fins 22 to position it in the air passage through the handle, as will presently more fully appear, and to provide air spaces around it, and having at opposite sides and in longitudinally spaced relation to each other binding screws 23 and 24, the heating unit conductor 15 and the energizing conductor 18 being secured together by the screw 23, and the heat unit conductor 16 and the energizing conductor 19 being secured together by the screw 24.

The fume conducting means consists of a cylindrical skirt 25, having its forward end flared, as at 26, and provided with a series of inwardly pressed circumferentially spaced ribs 27, for engaging about the soldering iron head member 10 of the tip to support it in spaced relation within the skirt. A heat insulating sleeve 28 of asbestos, or other suitable material, surrounds the head member 10 of the tip and insulates the sleeve from the tip, the sleeve being secured to the tip by means of set screws 29 engaged through apertures 30 in the bases of the rib portions 27 and screwed into threaded holes 31 drilled into the wall of the head member 10. By this arrangement the tip is rigidly supported within the skirt 25, with relatively small surface contact between the insulating sleeve 28 and the skirt, and with minimum metal to metal contact, and at the same time a confined air space is provided about the tip for the conduction of fumes, as will presently more fully appear.

The bell-shaped flared end of the skirt does not extend over the working end 11 of the tip, and the forward end of the heat insulating sleeve 28 projects forwardly for a short distance with respect to the forward end of the skirt, so that it will not draw air directly from the surface of the heated tip 11, the air flow being spaced around the tip, as shown by the arrows, Fig. 2, so that it effectually draws in all fumes produced by the soldering operation without cooling or otherwise interfering with the normal operation of the iron.

Rearwardly of the tip the skirt 25 is provided with a converging tapered shoulder portion 32, and a reduced diameter tubular extension 33 which surrounds the insulating beads 17 in spaced relation and houses and supports the connection block 21, as shown clearly in Fig. 5, the cross-sectional shape of this block permitting air to pass freely around it.

Upon the forward end portion of the tubular extension 33, adjacent the tapered shoulder 32, there is provided a heat radiating unit in the form of a collar 34 having a plurality of circumferential longitudinally spaced fins 35, this collar being preferably forced on the extension 33 with a press fit, and being secured by a set screw 36. It will be understood that any suitable form of heat radiating means between the soldering head and the handle may be employed, for instance the tube extension 33 between the shoulder 32 and the handle may have fins directly formed thereon.

Upon the rearward end of the tubular extension 33 there is engaged a tubular handle 37, which may be of wood or suitable composition material, and which is provided at its forward end adjacent the heat radiating unit with a metal ferrule 38 in contact with the end of the heat radiating unit and the tubular extension 33. The rearward end of the tubular extension projects beyond the end of the handle 37, and is exteriorly threaded, as at 39ª, and the handle is secured in place thereon by means of an interiorly threaded end cap member 39 screwed upon the tubular extension and fixed against turning by a set screw 40.

This cap member 39 is of special form to provide a sealed outlet for the cable 20 and a tubular connection for the suction tube. At one side of the center there is provided a passage 41 adapted to loosely receive the cable 20 and provided with an outwardly projecting exteriorly threaded nipple 42, upon which there is engaged an apertured flanged interiorly threaded cap 43, through which the cable extends, a compressible sealing washer 44, preferably of rubber, being disposed about the cable 20 between the end of the nipple 42 and the flange of the cap 43, so that when the latter is screwed down against the washer 44 the latter is compressed into tight binding relation about the cable 20 to form an air-tight seal.

At the other side of the center of the cap there is provided an air passage 45 having a tubular extension 46 provided at its end with a pair of spaced ribs 47, and upon this tubular extension the end of the suction tube 48 is engaged and secured by a clamping band 49 surrounding it between the ribs 47 and secured by a bolt and nut 50 to thus tightly secure the tube against removal. The tube 48 is preferably firm molded flexible tubing preferably high quality rubber meeting these requirements, so that when there is suction therein it will not collapse and will not be injuriously affected by the passage of fumes therethrough.

The other end of the tube 48 is suitably connected to a suction system, such as the suction outlet nipples 51 of a suction pipe 52 extending above a work table 53, this pipe 52 being connected to a suitable suction pump 54. The cable 20 is provided at its end with a plug 55 which is adapted to be plugged into one of the receptacles 56 provided on the work table. The suction tube and cable are held in connected parallel relation, for any desired distance from the iron, by means of a series of spring clips 57 having a reduced cylindrical portion engaging about the cable 20, and clamping leg portions 58 which are snapped into engagement about the tube 48.

In Figs. 7 and 8 I have illustrated a modified form of the invention in which the fume exhausting skirt member 25ª is in the form of a casting, of aluminum or other suitable material, having a converging shoulder portion 32ª at its rearward end and a tubular extension 33ª extending rearwardly from the shoulder. The tubular extension 33ª has a series of radial heat radiating fins 60 integrally cast thereon, the extension projecting a short distance rearwardly of the fins 60 and being provided with external screw threads 61, to which the tubular handle 37ª is secured, this handle being provided at its forward end with a ferrule 38ª interiorly screw-threaded, as at 62, to engage the screw thread 61. The skirt portion 25ª has projecting bosses 63 cast upon its inner surface, provided with counter-sunk holes 64, for the purpose of securing the skirt to the soldering iron in circumferentially spaced relation by means of screws 65 screwed into tapped holes 66 drilled into the iron.

Within the rearward end of the handle an exteriorly threaded metal tube 67 is secured, as for instance by outwardly punched or swedged prong portions 68, this tube projecting rearwardly from the handle to provide a mounting portion for the interiorly threaded exhaust tube cap 69 screwed thereon and fixed against turning by a set screw 70. This cap is provided with a centrally disposed tubular nipple 71 having a pair of spaced circumferential ribs 72 on its outer end surface, and the suction tube 73 has its end engaged thereon and secured by a clamping ring 74 adapted to be tightened about the tube between the ribs 72 by a bolt and nut connection 75. The cable 20 extends through the suction tube 73 to a point short of the connection of the suction tube with the suction pipe line. As shown in Fig. 8 the suction tube 73 is connected at its end to a tubular union 76 having a pair of spaced ribs 77 at one end by means of a clamping ring 78 engaged about the tube between said ribs and secured by a bolt and nut connection 79, and the other end of the union being exteriorly threaded, as at 80 and screwed into the interiorly threaded nipple 81 of the suction pipe line 52. Intermediate the ends of the union 76 there is provided a transversely extending exteriorly threaded outlet nipple 82 through which the cable 20 extends, the end of the cable being provided as in the first embodiment with a plug for plugging into a suitable receptacle. A flanged cap 83 is screwed upon the nipple 82, a rubber sealing washer 84 being disposed between the flange of the cap and the end of the nipple 82 which upon screwing down of the cap is compressed into sealing relation with the cable.

While I have shown the suction tube having the cable 20 carried within it in the embodiment illustrated in Figs. 7 and 8, it will be understood that the arrangement shown in the embodiment illustrated in Figs. 1 to 6 may be employed in which the cable is carried outside of the suction tube. Also the suction tube and cable arrangement as shown in Figs. 7 and 8 may be employed in the modification illustrated in Figs. 1 to 6. It will be noted that the projecting end of the tube 33, shown in Figs. 1 to 6, and the projecting end of the tube 67, shown in Fig. 7 are of the same diameter and projection, and that the caps 39 and 69 may be interchangeably screwed and secured thereon.

In Fig. 11 I have shown a further modification in which a metal handle portion 37$^b$ is formed integrally with the skirt extension 33$^b$ of the skirt 25$^b$, being provided with a threaded nipple extension 85 upon which the cap 69 is screwed. The cap 39 of the first embodiment may be employed in place of the cap 69 if desired.

I have illustrated and described preferred and satisfactory embodiments of the invention, but it will be understood that changes may be made therein, within the spirit and scope thereof, as defined in the appended claims.

Having thus described my invention, what I claim and desire to secure by Letters Patent is:

1. A fume exhausting soldering iron comprising a solder iron head having a forwardly projecting tip, a heating element cooperatively associated with said head, current conducting means connected to said heating element extending rearwardly therefrom, fume exhausting means comprising a skirt surrounding said head, there being air passages extending longitudinally of said skirt between said head and said skirt, and suction tube connection means carried by said fume exhausting means.

2. A fume exhausting soldering iron comprising a solder iron head having a forwardly projecting tip, a heating element cooperatively associated with said head, current conducting means connected to said heating element extending rearwardly therefrom, fume exhausting means comprising a skirt surrounding said head, means securing and supporting said head within said skirt, there being air passages extending longitudinally of said skirt between said head and said skirt, and suction tube connection means carried by said fume exhausting means.

3. A fume exhausting soldering iron comprising a solder iron head having a forwardly projecting tip, a heating element cooperatively associated with said head, current conducting means connected to said heating element extending rearwardly therefrom, fume exhausting means comprising a skirt surrounding said head, there being air passages extending longitudinally of said skirt between said head and said skirt, and suction tube connection means carried by said fume exhausting means, the forward end of said skirt being outwardly flared, and a sleeve surrounding said head projecting forwardly with respect to said skirt adapted to guide air-currents into said skirt in surrounding spaced relation to said tip.

4. A fume exhausting soldering iron comprising a solder iron head having a forwardly projecting tip, a heating element cooperatively associated with said head, current conducting means connected to said heating element extending rearwardly therefrom, fume exhausting means comprising a skirt surrounding said head, means securing said head within said skirt in spaced relation, a heat insulating sleeve surrounding said head, there being air passages extending longitudinally of said skirt between said sleeve and said skirt, and suction tube connection means carried by said fume exhausting means.

5. A fume exhausting soldering iron comprising a solder iron head having a forwardly projecting tip, a heating element cooperatively associated with said head, current conducting means connected to said heating element extending rearwardly therefrom, fume exhausting means comprising a skirt surrounding said head, there being air passages extending longitudinally of said skirt between said head and said skirt, tubular handle means connected to said skirt, said current conducting means extending through the passage of said handle means, and suction tube connection means carried by said tubular handle means.

6. A fume exhausting soldering iron comprising a solder iron head having a forwardly projecting tip, a heating element cooperatively associated with said head, current conducting means connected to said heating element extending rearwardly therefrom, fume exhausting means comprising a skirt surrounding said head, there being air passages extending longitudinally of said skirt between said head and said skirt, tubular handle means connected to said skirt, said current conducting means extending through the passage of said handle means, a cap secured to said handle means having an outlet for said current conducting means, and suction tube connection means carried by said cap.

7. A fume exhausting soldering iron comprising a solder iron head having a forwardly projecting tip, a heating element cooperatively associated with said head, current conducting means connected to said heating element extending rearwardly therefrom, fume exhausting means comprising a skirt surrounding said head, there being air passages extending longitudinally of said skirt between said head and said skirt, tubular handle means connected to said skirt, said current conducting means extending through the passage of said handle means, a cap secured to said handle means having a passage therethrough, a suction tube connected to said cap in communication with said passage, said current conducting means extending outwardly through said passage and suction tube.

8. A fume exhausting soldering iron comprising a solder iron head having a forwardly projecting tip, a heating element cooperatively associated with said head, current conducting means connected to said heating element extending rearwardly therefrom, fume exhausting means comprising a skirt surrounding said head, there being air passages extending longitudinally of said skirt between said head and said skirt, a tubular extension upon said skirt extending rearwardly therefrom in surrounding relation to said current conducting means, and suction tube connection means carried by said tubular extension means, having an opening through which said current conducting means is adapted to extend outwardly.

9. A fume exhausting soldering iron comprising a solder iron head having a forwardly projecting tip, a heating element cooperatively associated with said head, current conducting means connected to said heating element extending rearwardly therefrom, fume exhausting means comprising a skirt surrounding said head, there being air passages extending longitudinally of said skirt between said head and said skirt, a tubular extension upon said head and said skirt extending rearwardly therefrom in surrounding relation to said current conducting means, and handle means carried by said tubular extension.

10. A fume exhausting soldering iron comprising a solder iron head having a forwardly projecting tip, a heating element cooperatively associated with said head, current conducting means connected to said heating element extending rearwardly therefrom, fume exhausting means comprising a skirt surrounding said head, there being air passages extending longitudinally of said skirt between said head and said skirt, a tubular extension upon said skirt extending rearwardly therefrom in surrounding relation to said current conducting means, handle means carried by said tubular extension, and heat radiating means carried by said tubular extension between said skirt and said handle means.

F. JAMES C. SMITH.